(12) United States Patent
Öztürk et al.

(10) Patent No.: US 10,486,190 B2
(45) Date of Patent: Nov. 26, 2019

(54) PROCESS FOR PREPARING HMA HAVING A TACK-FREE COATING

(71) Applicant: ORGANIK KIMYA SANAYI VE TIC. A.S., Kemerburgaz/Eyup, Istanbul (TR)

(72) Inventors: Filiz Öztürk, Istanbul (TR); Viktor Benbanaste, Istanbul (TR); Guillermo Perez Lorenzo, Istanbul (TR); Sibel Altinok, Istanbul (TR)

(73) Assignee: Organik Kimya Sanayi Ve Tic. A.S., Istanbul (TR)

( * ) Notice: Subject to any disclaimer, the term of this patent is extended or adjusted under 35 U.S.C. 154(b) by 141 days.

(21) Appl. No.: 15/317,736

(22) PCT Filed: Jun. 12, 2015

(86) PCT No.: PCT/EP2015/001193
§ 371 (c)(1),
(2) Date: Dec. 9, 2016

(87) PCT Pub. No.: WO2015/188947
PCT Pub. Date: Dec. 17, 2015

(65) Prior Publication Data
US 2017/0113244 A1    Apr. 27, 2017

(30) Foreign Application Priority Data

Jun. 12, 2014 (EP) .................................... 14002028

(51) Int. Cl.
*B05D 1/18* (2006.01)
*B29C 37/00* (2006.01)
(Continued)

(52) U.S. Cl.
CPC ................. *B05D 1/18* (2013.01); *B05D 1/02* (2013.01); *B05D 1/305* (2013.01); *B29B 9/065* (2013.01);
(Continued)

(58) Field of Classification Search
CPC .. B05D 1/18; B05D 1/02; B05D 1/305; B29B 9/065; B29C 37/0067; B65B 63/08; B65B 63/4815
See application file for complete search history.

(56) References Cited

U.S. PATENT DOCUMENTS

| 4,576,835 A | 3/1986 | Gardenier et al. |
| 4,645,537 A | 2/1987 | Gardenier et al. |

(Continued)

FOREIGN PATENT DOCUMENTS

| EP | 0 469 564 A1 | 2/1992 |
| EP | 0 957 029 A1 | 11/1999 |

(Continued)

OTHER PUBLICATIONS

International Search Report received from the International Searching Authority dated Aug. 18, 2015, for International Application No. PCT/EP2015/001193.

(Continued)

*Primary Examiner* — Jacob T Minskey
*Assistant Examiner* — Cedrick S Williams
(74) *Attorney, Agent, or Firm* — McDonnell Boehnen Hulbert & Berghoff LLP

(57) ABSTRACT

The present invention relates to a process for preparing hot melt adhesive (HMA), preferably hot melt pressure sensitive adhesive (HMPSA), having a substantially tack-free coating, wherein said HMA, preferably HMPSA, can be easily handled, packed and transported for further use.

17 Claims, 1 Drawing Sheet

(51) Int. Cl.
  *B05D 1/02* (2006.01)
  *B05D 1/30* (2006.01)
  *B29B 9/06* (2006.01)
  *B29C 35/04* (2006.01)
  *B29K 105/00* (2006.01)

(52) U.S. Cl.
  CPC ........ *B29C 35/045* (2013.01); *B29C 37/0067* (2013.01); *B29C 2035/046* (2013.01); *B29K 2105/0097* (2013.01); *B29K 2105/251* (2013.01)

(56) References Cited

U.S. PATENT DOCUMENTS

| | | | |
|---|---|---|---|
| 4,774,138 A | 9/1988 | Gardenier et al. | |
| 5,112,552 A * | 5/1992 | Wittmann | B29C 33/60 |
| | | | 264/255 |
| 5,373,682 A | 12/1994 | Hatfield et al. | |
| 5,865,927 A | 2/1999 | Puletti et al. | |
| 6,120,899 A * | 9/2000 | Cameron | C08J 3/124 |
| | | | 428/407 |
| 6,230,890 B1 | 5/2001 | Waver et al. | |
| 6,716,527 B1 * | 4/2004 | Czmok | B01J 2/006 |
| | | | 428/403 |
| 2004/0074800 A1 | 4/2004 | Harwell et al. | |
| 2004/0143034 A1 * | 7/2004 | Primke | B29B 9/10 |
| | | | 523/176 |
| 2013/0317193 A1 * | 11/2013 | Desai | C08F 10/08 |
| | | | 526/348.6 |
| 2014/0357145 A1 * | 12/2014 | Remmers | B65G 19/18 |
| | | | 442/151 |

FOREIGN PATENT DOCUMENTS

| | | |
|---|---|---|
| EP | 2 415 572 A1 | 2/2012 |
| FR | 2 753 714 | 9/1996 |
| JP | H03-121176 A | 5/1991 |
| JP | 2002509944 A | 4/2002 |
| WO | 2006/050108 A1 | 5/2006 |
| WO | 2012/123282 A1 | 9/2012 |

OTHER PUBLICATIONS

International Written Opinion received from the International Searching Authority dated Aug. 18, 2015 for International Application No. PCT/EP2015/001193.

International Preliminary Report on Patentability dated Dec. 22, 2016 for International Application No. PCT/EP2015/001193 filed Jun. 12, 2015, 8 pages.

Japanese Office Action, dated Aug. 27, 2018, for Japanese Patent Application No. 2016-572295, pp. 1-7 (with 7-page English language translation).

* cited by examiner

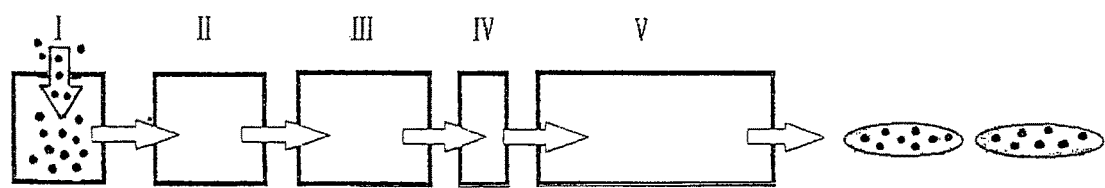

PROCESS FOR PREPARING HMA HAVING A TACK-FREE COATING

CROSS-REFERENCE

This application is a section 371 of International application no. PCT/EP2015/001193, filed Jun. 12, 2015 which claims priority from European Patent application no. 14002028, filed Jun. 12, 2014.

FIELD

The present invention relates to a process for preparing hot melt adhesive (HMA), preferably hot melt pressure sensitive adhesive (HMPSA), having a substantially tack-free coating, wherein said HMA, preferably HMPSA, can be easily handled, packed and transported for further use.

BACKGROUND

Hot melt adhesives (HMAs) are thermoplastic solid materials at room temperature and generally applied in molten or liquid state. Hot melt pressure sensitive adhesives (HMPSAs) are the class of HMAs which remain tacky after solidification and have the ability to adhere on surfaces upon application of pressure.

HMAs are packed in different forms in respect to the characteristics of the product and end user requirements. HMA and specifically HMPSA present a variety of handling difficulties and contamination risks due to the tacky nature of the products unless protected with a tack-free (i.e. "non-tacky") film or coating. Moreover, high tack HMPSA formulations which are required in certain applications easily deform and cold flow unless supported during shipment or when stored for prolonged times at elevated temperatures. As a consequence, tack-free HMPSA packaging techniques are developed and tried to be improved in various ways.

Many examples in the state of the art mention casting HMA and specifically HMPSA in molten state inside silicone coated containers such as carton boxes, drums, plastics, papers or disposable trays in different sizes. The material is subsequently cooled at ambient conditions or in large refrigerators during a suitable period of time, stacked, packed and prepared for dispatch. However, there are major disadvantages present as the product is cooled and solidified during a long period of time before delivery; additional shelves are required for cooling process; hazard potential is high as hot liquid is handled; the cost of disposable containers are costly for the manufacturer; the packaging needs to be separated with a significant physical force by the user before adding the material in the melt pot and the packaging is disposed at the end of the processing.

In U.S. Pat. No. 5,373,682 a process is described wherein a molten HMPSA is directly poured or pumped into a cylindrical plastic tube which is in contact with the heat sink to remove the excess heat from the film. The molten adhesive is fused to the surrounding film and a non-blocking adhesive package is provided which melts simultaneously with the adhesive and does not cause significant build up of packaging in the melt pot. In U.S. Pat. No. 5,865,927 a HMPSA with tack-free surface is described wherein the adhesive is extruded through a die orifice; the surface of the adhesive is sprayed with a molten film forming polymeric material, while the adhesive is still in molten state. The surface of the coated adhesive is subsequently heat treated in order to provide a continuous film and the adhesive mass is cooled to a temperature suitable for handling.

In addition to casting, pouring molten HMA in mold cavities or plastic tubes and coextrusion of adhesive together with a non-tacky coating, there are also examples available in the prior art for pelletizing or squeeze-cutting (pillows) of HMPSA and powdering with non-tacky components such as organic (polymeric) material (e.g. phenolic resins)-containing powders, individually coating pelletized materials with non-tacky materials or filling the adhesive into plastic packaging films. EP 0 410 914 discloses a method for preparation of non-tacky, free flowing polymeric particles by extruding the molten plastic material into a cooling fluid bath containing non-sticky material, that is compatible with the plastic material, cutting the plastic material into portions, separating the portions from the cooling fluid and subsequently contacting individual particles with a second non-sticky material preferably with powdered polyolefin waxes. U.S. Pat. No. 6,716,527 discloses a free flowing HMPSA in form of granulates wherein an outer layer of the material is not pressure sensitive up to 45° C. HMPSA in molten form is granulated underwater, dried and individually sprayed with a fine droplet liquid coating component comprised of polyethylene wax, defoamer, film former and water wherein individual pellets are covered at least 90% by the coating component. Powdering or individual coating of the HMPSA granulates or pieces have major drawbacks since the surface to volume ratio of the coating is significantly high and a high risk exists that the product is diluted and highly contaminated with the coating material.

EP 0 469 564 discloses a method wherein HMA is firstly formed as uniform separate portions, solidified and finally enveloped in larger portions by a plastic packaging film. The plastic packaging material is a component of the adhesive or chemically compatible with the adhesive hence the packaging can be melted with the adhesive in the pot. However, both the adhesive and the film come into contact in cold state and there is no fuse or substantial interactions between the film and the adhesive. Hence, during the melting period, adhesive and film melts separately and due to the air pockets between the film and the portions of the HMA, the film is pushed and gathered on the top of the melt pot. Consequently, the film cannot be melted properly and floats on the surface of the tank, so-called "jelly fish effect" in the prior art, and the film subsequently carbonizes and blocks the filters in the melt pot.

SUMMARY

The technical problem underlying the present invention is to provide a new process for obtaining a HMA mass, preferably a HMPSA mass, having a substantially tack-free coating in order to improve the handling of tacky materials as well as to eliminate the use of packaging films for HMAs, which cause carbonization and clogging problems in the HMA-melt pots. Further, the process should provide a flexibility for choosing the type of coating materials in terms of compatibility with HMA and melting behavior, which directly affects the product performance and end use properties of HMA, preferably HMPSA.

The solution to the above technical problem is achieved by providing the embodiments characterized in the claims. In particular, the present invention provides a process for preparing a HMA mass having a coating, wherein said coating has a tack-free property up to 50° C., said process comprising a step of applying a coating material present in liquid or molten form at least partially to the surface of the HMA mass present in solid form, wherein the coating material being applied is solidified and fixed within 60 seconds or less, preferably 30 seconds or less, but at least 0.1 seconds or more, e.g. in 0.1 to 30 seconds, on the surface of the HMA mass to form the coating. According to the present invention, the terms "HMA mass", "HMA material" and "HMA formulation", respectively, include preferably the class of HMPSAs; i.e. in a preferred embodiment the terms "HMA mass" or "HMA material" or "HMA formulation" as used herein can be replaced by the term "HMPSA mass" or "HMPSA material" or "HMPSA formulation". Moreover, the terms "tack-free" and "tack-free property" up to a certain temperature (T) mean that the material will not stick to the surfaces which it will typically come in contact with (packaging, operators hands etc.) below the referred temperature (T). Generally, said property can be evaluated by placing the material inside a carton box, where the blocks of HMA having the coating are in touch with each other. The box is closed and put in an oven at the referred temperature during one week. Then, the box is taken out of the oven and let it equilibrate at room temperature. Then, if every block of coated HMA can be taken easily out individually by hand without sticking to the neighboring block, protective paper or the operator's hand, the coating is evaluated as tack-free.

DESCRIPTION OF THE DRAWINGS

FIG. 1 is a block diagram illustrating a preferred embodiment of the process according to the present invention.

DETAILED DESCRIPTION

In one embodiment of the present invention, before the step of applying the coating material, preferably, the surface temperature of the HMA mass is in the range of from −20° C. to 40° C., for example room temperature (about 25° C.). The coating material in the melt pot has preferably a temperature of from 80° C. to 250° C., more preferred 120° C. to 210° C., most preferred from 150° C. to 200° C., when applied to the surface of the HMA mass. The coating material has preferably a DSC melting point or, in cases where melting point does not apply, a softening point (ASTM E 28) of more than 50° C.

In one embodiment of the present invention, the HMA mass may be present in pelletized form. Further, the HMA mass may comprise one or more constituents selected from the group consisting of polyesters, poly(meth)acrylates, polyolefins, polyurethanes, ethylene-based copolymers, polyvinyl acetate and copolymers thereof, copolymers of vinyl monomers and polyalkylene oxides, styrene block copolymers, and blends or mixtures thereof. Further, the HMA mass may contain as optional constituents/components one or more selected from the group consisting of tackifying resins, plasticizers, waxes, antioxidants, stabilizers, adhesion promoters, fillers, pigments, dyes, oils, and fragrances.

The coating material has a tack-free property up to 50° C. and may comprise one of more constituents selected from the group consisting of waxes or derivatives thereof, ethylene-based (co)polymers, polyolefins, polyvinyl acetate and copolymers thereof, poly(meth)acrylates, polyesters, polyvinyl alcohols, polyurethanes, copolymers of vinyl monomers and polyalkylene oxides, elastomeric block copolymers, and blends or mixtures thereof. Further, the coating material may contain as optional constituents/components one or more selected from the group consisting of plasticizers, stabilizers and antioxidants. The coating material does not, in principle, underlay any limitation, except the above tack-free property up to 50° C., when present as a coating, but may be preferably selected such that no negative impact (i.e. no significant detrimental effect) on the (expected) properties of the HMA is provided when melting the HMA mass having the coating for further applications by the end-user/customer. The coating material may be, applied by any method known in the art such as e.g. spray coating, curtain coating or immersion coating, wherein spray coating is preferred. In respect to immersion coating, the time period for immersing the HMA mass is preferably within a time period of from 0.1 to 30 seconds. After applying the coating material to the surface of the HMA mass, the formation of the coating may optionally be enhanced by flash-heating, preferably at a temperature of 150° C. to 250° C. during e.g. 0.1 to 10 seconds. Further, the applied coating may be cooled down to room temperature (about 25° C.) to obtain the HMA mass having the coating e.g. in ready-to-use form.

In a preferred embodiment, the process according to the present invention may comprise, prior to the step of applying the coating material at least partially to the surface of the HMA mass, one or more of the following steps, preferably in the given order:

pelletizing the HMA mass,
molding the HMA mass present as such or in pelletized form, with or without using pressure
drying the HMA mass present as such or in pelletized and/or molded form by evaporating and/or heating,
fixing the shape of the HMA mass present as such or in pelletized and/or molded and/or dried form by applying pressure, preferably via a piston or a secondary mold with tack-free coating.

The process of the present invention will be further explained herein-below by way of preferred embodiments and specific examples.

HMPSA is pelletized with conventional underwater pelletizing or extrusion systems, preferably capable of pelletizing HMPSA mass, into portions in various shapes and sizes, such as cylindrical, rectangular or spherical, preferably from 1 to 30 mm; solidified in a cooling fluid, preferably in water, and substantially dried at the end of the process as well known in the prior art. The cooling fluid may preferably consist of anti-blocking surface finishing materials, release agents or pelletizing aids as e.g. described in U.S. Pat. Nos. 4,645,537, 4,576,835 and 4,774,138, in order to keep the individual granulates from sticking to each other during the cooling process.

The HMPSA mass present in portions which are in cold state, preferably from 0° C. to 20° C., and temporarily in tack-free form owing to the low temperature, are filled into a mold cavity which can be constructed in different sizes, preferably to obtain from 250 g to 4.000 g of the HMPSA mass. The mold cavity may preferably have an anti-stick coating or can be made of any anti-stick elastomeric component, like silicone, Teflon, ceramic and other anti-stick coatings known in the art and combinations thereof. In another embodiment, the mold cavity can be made of disposable elements, like plastics, papers, carton boxes and combinations thereof. The mold cavity may have heating elements in order to temporarily bond the individual granules to retain the shape of the mold cavity. In another embodiment of the invention, the mold cavity may be perforated so that the filling operation can be done under vacuum in order to improve the regularity of the filling process. In another embodiment, the mold cavity may have additional units for spraying various liquids like cold water, mineral oil, etc., to the walls of the mold cavity, in order to increase the anti-stick property of the mold. In a further embodiment, the mold cavity may have additional units for applying pressure and better packing of the HMPSA portions. In another embodiment, there might be more than one mold cavities, wherein, the mold cavities are interchangeable and capable to work simultaneously, e.g. while one mold is filled, pressure is applied in the secondary mold, for improving the speed of the filling process.

The mold cavity is separated into pieces and opened, or completely separated and deformed if disposable, and the blocks of granules are moved to the coating zone on a conveyor belt. Before entering the coating zone, the blocks can be preferably conveyed through a heated low humidity zone in order to separate the remaining cooling fluid or condensed air. The heating zone is preferably below the softening point of the HMPSA, preferably below 80° C., so as not to soften the material and keep the air pockets open for substantial drying. Additionally, the HMPSA can pass through a second heating zone in order to flash heat the block close to its softening point and preferably pressure is applied with an anti-stick coated mass during a short period of time for better packing of the HMPSA portions. Consequently the block may keep the original shape after coating and cold flow, flaking and bleeding effect is substantially prevented, which may naturally occur during storage or transportation under high heat and pressure conditions. Before entering the coating zone, the HMPSA mass is optionally cooled to such extent that the surface temperature is within the range of from −20° C. to 40° C., e.g. room temperature (about 25° C.).

The block of HMPSA granulates are coated with a nontacky coating material in the final stage for easy handling. Coating can be done by spraying or fiberization with a suitable hot melt spray nozzle system, curtain coating or immersing HMPSA blocks into a sink filled with molten fluid of coating material which has the similar characteristics with the adhesive so that the coating does, in principle, not impart any negative effect during a later melting process of the coated HMPSA mass. During the application, the coating material interacts with the HMPSA granulates to a certain level and forms a united material, melts simultaneously and may form blends with the HMPSA material.

As the HMPSA mass is in cold state before the coating step, the coating material in molten form is set in a few seconds, i.e. in 60 seconds or less, preferably 30 seconds or less, but at least 0.1 seconds or more, e.g. in 0.1 to 30 seconds, on the HMPSA blocks and the product is ready for dispatch without and further subsequent cooling.

HMA (preferably HMPSA) may include a variety of available/known thermoplastic materials. Thermoplastic materials are any material that becomes or remains soft and moldable when subjected to heat, and becomes harder and relatively more rigid again when cooled, although the degree of rigidity and hardness may vary. Thermoplastic materials are used in the formulation to provide elasticity and base for the adhesive. They can be selected from (co)polymers such as polyesters, polyacrylates, polyolefins, polyurethanes, ethylene vinylacetate polymers (EVA), and other ethylene copolymers, like ethylene methacrylate, ethylene n-butyl acrylate and ethylene acrylic acid polymers; polyolefins, such as polyethylene, polypropylene and copolymers thereof, amorphous poly-α-olefins (APAO); polyvinyl acetate and copolymers thereof; poly(meth)acrylates from different acrylic monomers, for example alkyl(meth)acrylates, hydroxyalkyl(meth)acrylates, acrylamides; polyesters; polyvinyl alcohols; polyurethanes; copolymers of vinyl monomers and polyalkylene oxides. Other examples of thermoplastic polymers are elastic polymers, such as styrene block copolymers, like styrene-butadiene (SBs), styrene-isoprene (SI), styrene-isoprene-styrene (SIS), styrene-butadiene-styrene (SB), styrene-ethylene-butylene-styrene (SEBS), styrene-ethylene-butylene (SEB), styrene-ethylene-propylene-styrene (SEPS) and styrene-ethylene propylene (SEP).

The suitable thermoplastic material can be easily selected according to their compositions, molecular weights, melting points, viscosities or adhesive properties according to the end use requirements of the HMA, preferably HMPSA.

The HMA material (preferably HMPSA material), may contain additionally tackifying resins in combination with a thermoplastic polymer or thermoplastic polymer combinations, in order to provide adhesion and tackiness properties to the final adhesive, and optionally a plasticizer, wax, antioxidants and other components.

Tackifying resins in the HMA formulation of the present invention comprise natural and modified resins, terpene resins, phenol-modified hydrocarbon resins, aliphatic and aromatic hydrocarbon resins, hydrogenated hydrocarbons, hydrogenated resins and hydrogenated resin esters and rosins. Examples for rosins and their derivatives include wood rosin, tall oil, colophonium, gum rosin, wood rosin, rosin ester resins, including esters thereof and hydrogenated or dehydrogenated forms. Terpene resins include for example natural and synthetic terpenes, polyterpenes and terpenesters. Further examples include aromatic or mixed aliphatic-aromatic tackifying resins, like polymers from cyclopentadiene, dicyclopentadiene; styrene resins, like copolymers from styrene, alphamethyl styrene, vinyl toluene, methoxy styrene, tertiary butyl styrene, chlorostyrene; aliphatic resins from monomers such as 1,3-butadiene, cis-1,3-pentadiene, trans-1,3-pentadiene, 2-methyl-1,3-butadiene, 2-methyl-2-butene and other co-polymerizable monomers or aliphatic petroleum hydrocarbon resins. It is preferred that the tackifying resins have a softening point from about 70° C. to 150° C. (ring and ball method, measured by ASTM E28). The adhesive composition comprises an amount of tackifying resin preferably within the range of from 5 to 60% by weight based on the total weight of the HMA mass.

Optionally, plasticizers can be used in the HMA formulation, preferably for viscosity adjustment and to provide flow characteristics. The plasticizer content in the hot melt adhesive is in an amount of from 0 to 35 wt. %, preferably from 5 to 25 wt. %. Suitable plasticizers are medicinal and technical white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof.

Examples of plasticizer may also include hydrogenated plasticizers like oils or oligomers of polybutene. Monohydric or polyhydric alcohols and polyalkylene glycols may also be used. Another group of suitable plasticizers are esters, including, for example, liquid polyesters and glycerol esters, such as glycerol diacetate and glycerol triacetate as well as neopentyl glycol dibenzoate, glyceryl tribenzoate, pentaerythritol tetrabenzoate and 1,4-cyclohexanedimethanol dibenzoate. Further, plasticizers based on aromatic dicarboxylic acid esters can be also used, for example the esters of phthalic acid, isophthalic acid or terephthalic acid. Esters of sulfonic acids can be also used as plasticizer. Fatty acids are also suitable plasticizers. Such components are commercially available.

Optionally, waxes in quantities of from 0 to 30 wt. % based on the total weight of the HMA mass can be added to the HMA formulation. The quantity should be selected in an amount useful for viscosity adjustment and setting properties, without adversely affecting the adhesion. The wax may be of natural or synthetic origin. Suitable natural waxes are vegetable waxes, animal waxes, mineral waxes or petrochemical waxes. Suitable chemically modified waxes are hard waxes, such as montan ester waxes, sarsol waxes etc. Suitable synthetic waxes are polyalkylene waxes and polyethylene glycol waxes. Preferred waxes are petrochemical waxes, such as petrolatum, microwaxes and synthetic waxes, particularly polyethylene waxes, polypropylene waxes, optionally PE or PP copolymers, Fischer-Tropsch resins, paraffin waxes or microcrystalline waxes.

Additionally, other typical auxiliaries and additives can be incorporated in a selected HMA formulation. Examples are stabilizers, antioxidants, light stabilizers and/or adhesion promoters. Their function is to protect the polymers against decomposition during processing, storage or use. The stabilizers, more particularly UV stabilizers or antioxidants suitable for use include phosphites, phenols, sterically hindered phenols of high molecular weight, polyfunctional phenols, sulfur and phosphorus-containing phenols. They are added to the HMA formulation in quantities of typically up to 4 wt % and preferably from about 0.1 to about 2 wt %. Hindered phenols are known in the art and may be characterized as phenolic compounds which also contain sterically bulky radicals in close proximity to the phenolic hydroxyl group thereof. Examples of hindered phenols include 1,3,5-trimethyl-2,4,6-tris(3,5-di-tert-butyl-4-hydroxy benzyl) benzene; pentaerythritol tetrakis-3(3,5-di-tert-butyl-4-hydroxyphenyl) propionate; n-octadecyl-3 (3,5-ditert-butyl-4-hydroxyphenyl)propionate; 4,4'-methylenebis(4-methyl-6-tert-butyl phenol); 4,4'-thiobis(6-tert-butyl-o-cresol); 2,6-di-tert-butylphenol; 6-(4-hydroxyphenoxy)-2,4-bis(n-ocylthio)-1,3,5-triazine; 2,4,6-tris(4-hydroxy-3,5-di-tert-butyl-phenoxy)-1,3,5-triazine; di-n-octadecyl-3,5-di-tert-butyl-4-hydroxybenzyl-phosphonate; 2-(n-octylthio)ethyl-3,5-di-tert-butyl-4-hydroxybenzoate; and sorbitol hexa-(3,3, 5-di-tert-butyl-4-hydroxyphenyl) propionate. The effect of these stabilizers may be further enhanced by utilizing, in conjunction therewith, synergists such as, for example, thiodipropionate esters and phosphites; chelating agents and metal deactivators such as ethylenediaminetetraacetic acid and salts thereof, and disalicylalpropylenediimine.

The HMA formulation may additionally contain other compatible polymers, fillers, pigments, dyes, oils, fragrances and other conventional additives, if required.

The coating can be done with any conventional equipment with hot liquid coating capability known in the art and/or commercially available. In one aspect of the invention, individual blocks can be immersed into a melt pot filled with non-tacky coating in molten liquid form. In another aspect of the invention, curtain coating can be applied on the surface of the blocks. In a preferred embodiment of the present invention, the surface of the blocks can be sprayed with a thin layer of non-tacky coating, preferably up to a thickness of from 10 to 100 μm and the surfaces of the blocks are covered. These methods may also be combined. In order to provide a uniform coating pattern, it is preferred to use an equipment which can coat the entire adhesive surface in one step.

The coating material used in the process of the present invention is fused onto the HMPSA mass owing to the relatively higher temperature of the coating material or the due to the tacky nature of the HMPSA and fixed on the cold surface in a few seconds, i.e. in 60 seconds or less, preferably 30 seconds or less, but at least 0.1 seconds or more, e.g. in 0.1 to 30 seconds. Consequently, the product gains the ability to melt simultaneously with the adhesive in the melt tank. Optionally, a flash heating can also be applied to further improve the continuous film forming of the non-tacky coating. Since the HMA is in solid form at the beginning of the coating step, no subsequent time consuming cooling operation is required.

The coating material used in the process of the present invention may be any thermoplastic material, but having tack-free property up to 50° C. Preferably, the coating material is a hot melt material. The coating material may be selected from waxes and its derivatives, including petroleum waxes such as paraffin wax having a melting point of from about 54 to 85° C., and microcrystalline waxes having a melting point of from about 54 to 95° C., the latter melting points being determined by DSC method, atactic polypropylene having a Ring and Ball softening point of from about 120 to 160° C.; determined by ASTM E-28, metallocene catalyzed propylene-based waxes, metallocene catalyzed waxes or single-site catalyzed waxes, synthetic waxes made by polymerizing carbon monoxide and hydrogen such as Fischer-Tropsch waxes; and polyolefin waxes. Each of these waxes is solid at room temperature. Other useful substances/components include "animal or vegetable waxes" as named in the adhesive industry, where the examples are not limited to hydrogenated animal, fish and vegetable fats and oils such as hydrogenated tallow, lard, soy oil, cottonseed oil, castor oil, menhadin oil, cod liver oil, etc., and which are solid at ambient temperature by virtue of being hydrogenated. These have also been found to be useful with respect to functioning as a wax material equivalent. Among the useful partially crystalline ethylene-based polymers LDPE, VLDPE, LLDPE, MDPE obtained by Ziegler-natta catalyst polymerization, or LDPE, EVA, EAA, EMA, EBA, EE2HA, obtained by gas phase random polymerization, or EO, EP, EB, EH, ESI copolymers, obtained by Ziegler-natta catalyst polymerization or single-site catalyst polymerization or metallocene catalyst polymerization may be mentioned. Additionally, other ethylene copolymers, like ethylene methacrylate, ethylene n-butyl acrylate and ethylene acrylic acid polymers; polyolefins, such as polyethylene, polypropylene and copolymers, amorphous poly-α-olefines (APAO); polyvinyl acetate and copolymers; poly(meth)acrylates from different acrylic monomers, for example alkyl(meth)acrylates, hydroxyalkyl(meth)acrylates, acrylamides; polyesters; polyvinyl alcohols; polyurethanes; copolymers of vinyl monomers and polyalkylene oxides may be mentioned. Other useful substances include elastomeric block copolymers including SB, SI, SBS, SIS, SEBS, SEPS and SEP. Among the useful elastomers are elastomeric copolymers of ethylene and propylene, or such copolymers modified with functional monomers. Examples are EPR rubber, EPDM rubber and/or blends of EPR and EPDM. The functional monomers include a class of unsaturated organic compounds containing one or more functional groups including carboxylic acid group, anhydride group, hydroxyl group, ether group, primary, secondary and tertiary amine groups and ester group.

Optionally, plasticizers can be used in the coating composition ("coating material"). Suitable plasticizers are medicinal and technical white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof. The coating composition in the present invention may also optionally include a stabilizer or antioxidant, in order to help to protect the polymers noted above, and thereby the total adhesive system, from the effects of thermal and oxidative degradation which normally occurs during the manufacture and application of the coating composition as well as in the ordinary exposure of the final product to the ambient environment.

Referring to FIG. 1, in a preferred embodiment, HMPSA in molten form is granulated or cut into small portions and subsequently solidified in a cooling medium, preferably in water by any conventional underwater pelletizer or extrusion line capable of granulating HMPSA. Portions of the HMPSA which are in cold state, from 0° C. to 20° C., preferably from 5° C. to 15° C., and temporarily in tack-free form as a consequence of the low temperature, are filled into a mold cavity which can be constructed in various sizes and shapes in Zone I. The mold cavity may preferably have anti-stick coating or can be produced of a material which naturally represents anti-stick property, like silicone. The anti-stick property of the mold cavity can further be increased by spraying various liquids like cold water, mineral oil, etc., to the walls of the mold cavity, at the beginning of the filling process. In another embodiment the mold cavity can be made of disposable elements, like plastics, papers, carton boxes and combinations thereof. Mold cavity may be in various shapes like rectangular, spherical, cylindrical and the like; and in various sizes preferably from 250 g to 4.000 g. In another aspect of the invention, the mold cavity may have additional heating elements like resistance or pressure elements like pneumatic pistons which can be used in order to help blocks of HMPSA to keep the shape of the mold during the transport on the conveyor. In another embodiment, the mold cavity may be perforated or may include holes so that the filling process can be proceed under vacuum. In another aspect of the invention, hot air injection can be applied to prevent the condensation due to the temperature difference between HMPSA and ambient air. Additionally, a liquid in molten state which has similar properties as HMPSA can be sprayed simultaneously during the filling process to stick the individual granules and help the block to retain the shape of the mold cavity.

Referring to FIG. 1, the mold cavity is separated into pieces and opened, or completely separated and deformed if disposable, and the blocks of HMPSA portions are conveyed through the next zone. In Zone II, the product is exposed to warm air with low humidity level, preferably less than 5% Relative Humidity (RH), in order to evaporate any means of humidity inherited from the granulating process or any possible condensation emerged during the process. The humidity content of the air can be regulated by any conventional air treatment equipment. The Zone II can be heated with various controlled heating elements known in the art, such as convection, infrared heating, microwave heating and combinations thereof. The temperature of the Zone II is preferably below 80° C. for keeping the HMPSA material in solid form and the air gaps as open as possible for efficient drying.

Referring to FIG. 1, HMPSA in solid block form is conveyed through the Zone III for further heating wherein the HMPSA is heated to a temperature close to its softening point, preferably more than 60° C., and gain the ability to be shaped via pressure in Zone III. Similar to Zone II, Zone III can be heated with various controlled heating elements and the humidity content can be regulated with external air treatment equipment.

Referring to FIG. 1, HMPSA in solid block form is conveyed through the Zone IV and pressure is applied with a piston or a secondary mold, preferably treated with an anti-stick coating to fix and smoothen the shape of the HMPSA block entering to the coating zone. In Zone III and Zone IV, transport and storage conditions are simulated by applying similar heat and pressure before the HMPSA block is entered to the coating zone. Consequently, the cold flow and bleeding behavior which may cause deformation of the blocks and undesirably sticking of the adhesive to the packaging are prevented to a good extent. Moreover, the surface to volume ratio of the HMPSA mass is reduced by smoothing the surface of the HMPSA mass and hence the amount of coating applied on the HMPSA mass is decreased.

Referring to FIG. 1, HMPSA in solid block form is conveyed through the Zone V, where the non-tacky coating material in molten liquid form is applied, wherein the coating material has a DSC melting point or, in some cases where melting point does not apply, a softening point (ASTM E 28) of more than 50° C. The non-tacky coating is being selected so that it would not detract from the properties of the adhesive composition when re-melted.

Example I

A conventional HMPSA composition for disposable applications was produced using a styrene-butadiene-styrene block copolymer. Tackifier is added for adhesion and plasticizer is added for adjusting the flow properties of the product.

HMPSA in molten form is granulated to 3 mm pellets and subsequently solidified in cold water with a temperature around 4° C. by a conventional underwater pelletizer or an extrusion line capable of granulating HMPSA.

Granulates of HMPSA in cold state with a temperature around 8° C. and temporarily in tack-free form is filled into a cylindrical mold cavity with a capacity of 1 liter, where the inner surface of the mold is coated with an anti-stick material.

The mold cavity is separated into two pieces and the HMPSA granulates in the shape of the mold cavity and having a weight of about 1 kg is released on the conveyor coated with anti-stick material.

The HMPSA mass is carried through a forced convection conveyor oven, where the hot and low humidity air with 40° C. temperature and 5% Relative Humidity (RH) is supplied. Humidity level of the air is controlled by a conventional air treatment equipment. In this zone, residual moisture inherited from the granulating process or possible condensation emerged during the process on the HMPSA mass is evaporated.

After the treatment, the surface temperature of the HMPSA mass leaving the conveyor is increased from 8° C. to room temperature (about 25° C.) and any further condensation on the granulates is prevented by equalizing the temperature of the HMPSA with the ambient temperature.

The HMPSA mass is conveyed through the coating zone where the HMPSA mass is dipped, in less than 2 seconds, into a melt pot filled with non-tacky high temperature molten hot melt adhesive (HMA) as the coating material at 180° C. The coating material is formulated with a butadiene-styrene block copolymer, tackifier, plasticizer and wax, and the viscosity of the coating material is about 500 cps (180° C.). The HMPSA mass is totally covered with the coating material and the coating material in hot liquid form is fused onto the surface of the HMPSA mass. The coating is cooled down in 10 seconds.

The final product is present in substantially tack-free form and the coating has the ability to melt simultaneously with the HMPSA mass in the melt tank for further application.

Example II

A conventional HMPSA composition for disposable applications was produced using a styrene-butadiene-styrene block copolymer. Tackifier is added for adhesion and plasticizer is added for adjusting the flow properties of the product and antioxidant is added for heat stability.

HMPSA in molten form is granulated to 4 mm pellets and subsequently solidified in cold water with a temperature around 10° C. by a conventional underwater pelletizer or an extrusion line capable of granulating HMPSA.

Granulates of HMPSA in cold state with a temperature around 15° C. and temporarily in tack free form is filled into a cylindrical mold cavity with a capacity of 1 liter, where the inner surface of the mold is coated with an anti-stick material.

The mold cavity is opened and HMPSA granulates in the shape of the mold cavity and having a weight of about 1 kg is released on the conveyor coated with anti-stick material.

The HMPSA mass is carried through a forced convection conveyor oven where air, which is at ambient temperature (about 25° C.) and 5% Relative Humidity (RH), is supplied. In this zone, residual moisture inherited from the granulating process or possible condensation emerged during the process on the HMPSA mass is evaporated.

After the treatment, the surface temperature of the HMPSA mass leaving the conveyor is increased from 15° C. to room temperature (about 25° C.) and any further condensation on the granulates is prevented by equalizing the temperature of the HMPSA with the ambient temperature.

The HMPSA mass is conveyed through the coating zone where the HMPSA mass is dipped, in less than 2 seconds, into a melt pot filled with non-tacky high temperature molten hot melt adhesive (HMA) as the coating material at 190° C. The coating material is formulated with a butadiene-styrene block copolymer, tackifier, plasticizer, wax and antioxidant and the viscosity of the coating material is about 400 cps (190° C.). The HMPSA mass is totally covered with the coating material and coating material in hot liquid form is fused onto the surface of the HMPSA mass.

The coating is cooled down in 12 seconds. The final product is present in substantially tack-free form and the coating has the ability to melt simultaneously with the HMPSA mass in the melt tank further application.

Example III

A conventional HMPSA composition for disposable application was produced using a styrene-butadiene-styrene block copolymer. Tackifier is added for adhesion and plasticizer is added for adjusting the flow properties of the product and antioxidant is added for heat stability.

HMPSA in molten form is granulated to 4 mm pellets and subsequently solidified in cold water with a temperature around 10° C. by a conventional underwater pelletizer or an extrusion line capable of granulating HMPSA.

Granulates of HMPSA in cold state with a temperature around 15° C. and temporarily in tack-free form is filled into a cylindrical mold cavity with a capacity of 1 liter, where the inner surface of the mold is coated with an anti-stick material.

The mold cavity is opened and HMPSA granulates in the shape of the mold cavity and having a weight of about 1 kg is released on the conveyor coated with anti-stick material.

The HMPSA mass is carried through a forced convection conveyor oven where air, which is at ambient temperature (about 25° C.) and 5% Relative Humidity (RH) is supplied. In this zone, residual moisture inherited from the granulating process or possible condensation emerged during the process on the HMPSA mass is evaporated.

After the treatment, the surface temperature of the HMPSA mass leaving the conveyor is increased from 15° C. to room temperature (about 25° C.) and any further condensation on the granulates is prevented by equalizing the temperature of the HMPSA with the ambient temperature.

The HMPSA mass is conveyed through the coating zone where the HMPSA mass is dipped, in less than 2 seconds, into a melt pot filled with non-tacky high temperature molten liquid as the coating material at 190° C. The coating material is a paraffin wax with a viscosity of about 50 cps (190° C.) and DSC melting point of 64° C. The HMPSA mass is totally covered with the coating material in hot liquid form and fused onto the surface of the HMPSA mass. The coating is cooled down in 3 seconds.

The final product is present in substantially tack-free form and the coating has the ability to melt simultaneously with the adhesive in the melt tank during application.

Example IV

A conventional HMPSA composition for disposable application was produced using a styrene-butadiene-styrene block copolymer. Tackifier is added for adhesion and plasticizer is added for adjusting the flow properties of the product and antioxidant is added for heat stability.

HMPSA in molten form is granulated to 4 mm pellets and subsequently solidified in cold water with a temperature around 6° C. by a conventional underwater pelletizer or an extrusion line capable of granulating HMPSA.

Granulates of HMPSA in cold state with a temperature around 10° C. and temporarily in tack-free form is filled into a cylindrical mold cavity with a capacity of 1 liter, where the inner surface of the mold is coated with an anti-stick material. After the filling operation, the HMPSA in the mold cavity is pressurized via a piston with anti-stick coating for better packing of HMPSA material.

The mold cavity is opened and HMPSA granulates in the shape of the mold cavity and having a weight of about 1 kg is released on the conveyor coated with anti-stick material.

The HMPSA mass is carried through a forced convection conveyor oven where air, which is at ambient temperature (about 25° C.) and 5% Relative Humidity (RH) is supplied. In this zone, residual moisture inherited from the granulating process or possible condensation emerged during the process on the HMPSA mass is evaporated.

After the treatment, the surface temperature of the HMPSA mass leaving the conveyor is increased from 15° C. to room temperature (about 25° C.) and any further condensation on the granulates is prevented by equalizing the temperature of the HMPSA with the ambient temperature.

The HMPSA mass is conveyed through the coating zone where the overall surface of the HMPSA mass is sprayed with non-tacky high temperature molten liquid as the coating material at 180° C. The coating material is formulated with a butadiene-styrene block copolymer, tackifier, plasticizer and wax, and the viscosity of the coating material is about 500 cps (180° C.). The HMPSA mass is covered with the coating material in hot liquid form and fused onto the surface of the HMPSA mass. The coating is cooled down in 9 seconds.

The final product is present in substantially tack-free form and the coating has the ability to melt simultaneously with the adhesive in the melt tank during application.

Example V

A conventional HMPSA composition for disposable application was produced using a styrene-butadiene-styrene block copolymer. Tackifier is added for adhesion and plasticizer is added for adjusting the flow properties of the product and antioxidant is added for heat stability.

HMPSA in molten form is granulated to 4 mm pellets and subsequently solidified in cold water with a temperature around 6° C. by a conventional underwater pelletizer or an extrusion line capable of granulating HMPSA.

Granulates of HMPSA in cold state with a temperature around 10° C. and temporarily in tack-free form is filled into a cylindrical mold cavity with a capacity of 1 liter, where the inner surface of the mold is coated with an anti-stick material. After the filling operation, the HMPSA in the mold cavity is pressurized via a piston with anti-stick coating for better packing of HMPSA material.

The mold cavity is opened and HMPSA granulates in the shape of the mold cavity and having a weight of about 1 kg is released on the conveyor coated with anti-stick material.

The HMPSA mass is carried through a forced convection conveyor oven where air, which is at ambient temperature (about 25° C.) and 5% Relative Humidity (RH) is supplied. In this zone, residual moisture inherited from the granulating process or possible condensation emerged during the process on the HMPSA mass is evaporated.

After the treatment, the surface temperature of the HMPSA mass leaving the conveyor is increased from 15° C. to room temperature (about 25° C.) and any further condensation on the granulates is prevented by equalizing the temperature of the HMPSA with the ambient temperature.

The HMPSA mass is conveyed through the coating zone where the overall surface of the HMPSA mass is sprayed with non-tacky high temperature molten liquid as the coating material at 170° C. The coating material is an EVA copolymer with a melt index of 500 g/10 min according to ASTM D 1238, vinyl acetate content, by mass, of 18%, and DSC melting point of 86° C. The HMPSA mass is covered with the coating material and the coating material is well interacted with the surface of the HMPSA mass. The coating is cooled down in 1 seconds.

The final product is present in substantially tack-free form and the coating has the ability to melt simultaneously with the adhesive in the melt tank during application.

The invention claimed is:

1. A process for preparing a hot melt adhesive (HMA) having a coating, said coating having a tack-free property up to 50° C., said process comprising a step of applying a coating material present in liquid or molten form at least partially to a surface of a block of HMA granules present in solid form, wherein the coating material being applied is solidified and fixed within 60 seconds or less on the surface of the block to form the coating.

2. The process according to claim 1, wherein, in the step of applying the coating material, the surface temperature of the block is in the range of from −20° C. to 40° C.

3. The process according to claim 1, wherein the coating material has a DSC melting point or a softening point (ASTM E 28) of more than 50° C.

4. The process according to claim 1, wherein the HMA comprises one or more constituents selected from the group consisting of polyesters, poly(meth)acrylates, polyolefins, polyurethanes, ethylene-based (co)polymers, polyvinyl acetate and copolymers thereof, copolymers of vinylmonomers and polyalkylene oxides, styrene block copolymers, and blends or mixtures thereof, and optionally one or more constituents selected from the group consisting of tackifying resins, plasticizers, waxes, antioxidants, stabilizers, adhesion promoters, fillers, pigments, dyes, oils, and fragrances.

5. The process according to claim 1, wherein the coating comprises one or more constituents selected from the group consisting of waxes or derivatives thereof, ethylene-based (co)polymers, polyolefins, polyvinyl acetate and copolymers thereof, poly(meth)acrylates, polyesters, polyvinyl alcohols, polyurethanes, copolymers of vinyl monomers and polyalkylene oxides, and elastomeric block copolymers, and blends or mixtures thereof, and optionally one or more constituents selected from the group consisting of plasticizers, stabilizers and antioxidants.

6. The process according to claim 1, wherein the coating has no negative impact on the properties of the HMA, upon melting the HMA having the coating.

7. A hot melt adhesive having a coating, said coating having a tack-free property up to 50° C., obtainable by a process according to claim 1.

8. The process according to claim 1, wherein prior to the step of applying the coating material, the process further comprises the steps of:
  granulating a HMA mass to form HMA granules; and
  molding the HMA granules, with or without applied pressure, to form the block of HMA granules.

9. The process according to claim 8, further comprising drying the HMA granules by evaporation and/or applying heat.

10. The process according to claim 8, further comprising fixing a shape of the block of HMA granules by applying pressure.

11. The process according to claim 8, wherein the HMA mass is granulated by pelletization or extrusion.

12. The process according to claim 8, further comprising drying the block of HMA granules by evaporation and/or applying heat.

13. The process according to claim 12, further comprising fixing a shape of the block of HMA granules by applying pressure.

14. The process according to claim 1, wherein the coating material is applied by spray coating, curtain coating, immersion coating, or combinations thereof.

15. The process according to claim 14, wherein the immersion coating is conducted within a time period of 0.1 to 30 seconds.

16. A process for preparing a hot melt adhesive (HMA) having a coating, said coating having a tack-free property up to 50° C., said process comprising:
  granulating a HMA mass to form HMA granules;
  molding the HMA granules, with or without applied pressure, to form the block of HMA granules;
  drying the block of HMA granules by evaporation and/or applying heat;
  fixing a shape of the block of HMA granules by applying pressure; and
  applying a coating material present in liquid or molten form at least partially to a surface of the block of HMA granules present in solid form, wherein the coating material being applied is solidified and fixed within 60 seconds or less on the surface of the block to form the coating.

17. The process according to claim 16, wherein the HMA mass is granulated by pelletization or extrusion.

* * * * *